United States Patent
Kuratani et al.

(10) Patent No.: US 10,658,894 B2
(45) Date of Patent: May 19, 2020

(54) ROTOR OF MOTOR, MOTOR AND PUMP DEVICE

(71) Applicant: NIDEC SANKYO CORPORATION, Suwa-gun Nagano (JP)

(72) Inventors: Hiroki Kuratani, Suwa-gun Nagano (JP); Takashi Yamamoto, Suwa-gun Nagano (JP); Nobuki Kokubo, Suwa-gun Nagano (JP); Masaki Harada, Suwa-gun Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 277 days.

(21) Appl. No.: 15/895,300

(22) Filed: Feb. 13, 2018

(65) Prior Publication Data

US 2018/0233976 A1    Aug. 16, 2018

(30) Foreign Application Priority Data

Feb. 14, 2017    (JP) ................... 2017-024964

(51) Int. Cl.
| | |
|---|---|
| H02K 1/30 | (2006.01) |
| H02K 1/14 | (2006.01) |
| H02K 7/14 | (2006.01) |
| H02K 1/27 | (2006.01) |
| H02K 5/22 | (2006.01) |
| H02K 3/52 | (2006.01) |
| F04D 13/06 | (2006.01) |
| F04D 1/00 | (2006.01) |

(52) U.S. Cl.
CPC .............. *H02K 1/30* (2013.01); *H02K 1/146* (2013.01); *H02K 1/2733* (2013.01); *H02K 1/2753* (2013.01); *H02K 3/522* (2013.01); *H02K 5/225* (2013.01); *H02K 7/14* (2013.01); *F04D 1/00* (2013.01); *F04D 13/06* (2013.01); *H02K 2205/03* (2013.01)

(58) Field of Classification Search
CPC .. H02K 1/30; H02K 1/14; H02K 1/27; H02K 7/14; H02K 1/146; H02K 5/225; H02K 1/2753; H02K 1/2733; H02K 3/522; H02K 2205/03; F04D 13/06; F04D 1/00
See application file for complete search history.

(56) References Cited

U.S. PATENT DOCUMENTS

| | | | |
|---|---|---|---|
| 2006/0284506 A1* | 12/2006 | Kim ................. | H02K 1/2733 310/156.13 |
| 2011/0291498 A1* | 12/2011 | Sakata ............... | H02K 1/278 310/43 |
| 2020/0006991 A1* | 1/2020 | Yamagata ........... | H02K 1/04 |

FOREIGN PATENT DOCUMENTS

JP    2010246238 A    10/2010

* cited by examiner

*Primary Examiner* — Naishadh N Desai
(74) *Attorney, Agent, or Firm* — Cantor Colburn LLP

(57) ABSTRACT

A rotor may include a rotation shaft, a magnet on an outer peripheral side, a holding member holding the rotation shaft and the magnet, and a plurality of recessed parts provided in an end face of the magnet in an axial line direction of the rotation shaft so as to be separated from each other in a circumferential direction. A surface of each of the recessed parts is formed in a spherical shape, the holding member has a flange portion which covers the end face of the magnet from an end on an inner peripheral side of the end face of the magnet to an outer peripheral side with respect to the plurality of the recessed parts, and the flange portion is adhered to the surfaces of the recessed parts.

30 Claims, 9 Drawing Sheets

ROTOR OF MOTOR, MOTOR AND PUMP DEVICE

CROSS REFERENCE TO RELATED APPLICATION

The present application claims priority under 35 U.S.C. § 119 to Japanese Application No. 2017-024964 filed Feb. 14, 2017, the entire content of which is incorporated herein by reference.

FIELD OF THE INVENTION

At least an embodiment of the present invention may relate to a rotor of a motor comprising a magnet. Further, at least an embodiment of the present invention may relate to a motor comprising a rotor having a magnet and a stator having a coil. Further, at least an embodiment of the present invention may relate to a pump device structured to rotate an impeller by a motor.

BACKGROUND

A pump device including an impeller and a motor for rotating the impeller is described in Japanese Patent Laid-Open No. 2010-246238. In the pump device, a rotor of the motor includes a sleeve-shaped radial bearing rotatably supported by a fixed shaft, a cylindrical tube shaped magnet disposed on an outer peripheral side with respect to the radial bearing, and a holding member which holds the radial bearing and the magnet. The magnet is provided with four recessed parts in a ring-shaped end face on one side in a rotation center line direction of the rotor. The recessed parts are formed in a circular arc shape with the rotation center line as a center and are provided at equal angular intervals around the rotation center line.

The magnet is attached with a scattering prevention member for preventing the magnet from scattering even if the magnet is broken. The scattering prevention member is a metal member and is provided with a ring-shaped plate part which covers a region on an inner peripheral side of four recessed parts in the ring-shaped end face of the magnet, and four protruded parts which are protruded to the magnet side from an outer peripheral edge portion of the ring-shaped plate part and are inserted into the respective recessed parts.

In this case, when scattering of the magnet is prevented without attaching a dedicated member, the number of components of the rotor is reduced and thus manufacturing costs of a rotor, a motor and a pump device can be reduced.

SUMMARY

In view of the problem described above, at least an embodiment of the present invention may advantageously provide a rotor of a motor which is capable of preventing scattering of a magnet without attaching a dedicated member even in a case that the magnet is broken. Further, at least an embodiment of the present invention may advantageously provide a motor comprising the rotor. In addition, at least an embodiment of the present invention may advantageously provide a pump device structured to rotate an impeller by a motor comprising the rotor.

According to at least an embodiment of the present invention, there may be provided a rotor of a motor including a rotation shaft, a magnet which is disposed on an outer peripheral side with respect to the rotation shaft, a holding member which holds the rotation shaft and the magnet, and a plurality of recessed parts which are provided in an end face of the magnet in an axial line direction of the rotation shaft so as to be separated from each other in a circumferential direction. A surface of each of the recessed parts is formed in a spherical shape, the holding member is provided with a flange portion which covers the end face of the magnet from an end on an inner peripheral side of the end face of the magnet to an outer peripheral side with respect to the plurality of the recessed parts, and the flange portion is adhered to the surfaces of the recessed parts.

In at least an embodiment of the present invention, a plurality of recessed parts is formed in an end face of a magnet and a flange portion of a holding member covering a portion of the end face of the magnet is adhered to surfaces of the recessed parts. Therefore, the flange portion of the holding member functions as a scattering prevention member which prevents the magnet from scattering even if the magnet is broken. Accordingly, a dedicated member for preventing scattering is not required to be attached to the magnet and thus the number of components of the rotor can be reduced. As a result, a manufacturing cost of the rotor can be reduced. Further, a surface of the recessed part provided in the end face of the magnet is formed in a spherical shape and thus a portion of the magnet where the recessed part is provided is prevented or suppressed from being broken. In this case, the expression that "a surface of the recessed part is formed in a spherical shape" means that a surface of the recessed part is formed in a shape that a part of an outer peripheral face of a ball is transferred.

In at least an embodiment of the present invention, it is desirable that the plurality of the recessed parts is provided on the inner peripheral side of the end face of the magnet. According to this structure, a magnetic field of an outer peripheral face of the magnet can be suppressed from being affected by a plurality of the recessed parts which are provided in the end face of the magnet.

In at least an embodiment of the present invention, it is desirable that the magnet is formed in a ring shape so as to surround the rotation shaft, an end portion on the inner peripheral side of the end face of the magnet is formed with a tapered face which is inclined toward the inner peripheral side, and the plurality of the recessed parts is provided in the tapered face. According to this structure, a thickness in the axial line direction of a portion of the flange portion which covers the tapered face is easily secured. In other words, a thickness in the axial line direction of a portion of the flange portion which is adhered to the surfaces of the plurality of the recessed parts is easily secured. As a result, the magnet can be surely held by the flange portion and thus scattering of the magnet is easily suppressed. Specifically, it may be structured that the plurality of the recessed parts is provided in the tapered face at equal intervals in a circumferential direction so as to have a size so that turning of the magnet with respect to the holding member formed of resin is prevented.

In at least an embodiment of the present invention, it is desirable that the end face of the magnet is formed with a groove extended around an axial line on an outer peripheral side with respect to the plurality of the recessed parts, and the flange portion covers the end face of the magnet to an outer peripheral side with respect to the groove and adheres to a surface of the groove. Specifically, it may be structured that the end face of the magnet is formed with a groove extended around the axial line over the entire periphery of the end face on an outer peripheral side with respect to the plurality of the recessed parts, and the flange portion covers the end face of the magnet to an outer peripheral side with respect to the groove and adheres to the entire surface of the groove. According to this structure, the flange portion which is adhered to the surface of the groove prevents the magnet from scattering. Therefore, scattering of the magnet is easily suppressed.

In at least an embodiment of the present invention, it is desirable that a cross section of the groove which is cut in a radial direction is a circular arc shape. According to this structure, a portion of the groove in the magnet is prevented or suppressed from being broken.

In at least an embodiment of the present invention, it is desirable that the holding member which is a resin molded product includes a rotation shaft holding part in a tube shape which holds the rotation shaft from an outer peripheral side, a magnet holding part in a ring shape which holds the magnet on an outer peripheral side with respect to the rotation shaft holding part, and a plurality of connecting parts which are extended in a radial direction and connect the rotation shaft holding part with the magnet holding part. The magnet holding part is provided with the flange portion, the number of the plurality of the recessed parts and the number of the plurality of the connecting parts are the same as each other, and each of the recessed parts is located on an outer side with respect to each of the connecting parts in the radial direction. According to this structure, when the holding member is to be formed by insert molding in a state that the magnet is inserted in an inside of a die, the resin injected into the die and circulated through die portions forming a plurality of the connected parts is easily filled in the recessed parts in the end face of the magnet without gap spaces.

In at least an embodiment of the present invention, it may be structured that the magnet is a compression-molded product and an end portion on an inner peripheral side of the end face of the magnet is formed with a ring-shaped face on an inner peripheral side of the tapered face. According to this structure, the recessed parts are easily formed when the magnet is compression-molded.

According to at least an embodiment of the present invention, there may be provided a motor including the rotor described above and a stator having a plurality of coils which is arranged in a ring shape on an outer peripheral side with respect to the rotor.

In at least an embodiment of the present invention, the holding member which holds the magnet of the rotor functions also as a scattering prevention member. Therefore, even if the magnet is broken, the magnet is prevented or suppressed from scattering and obstructing rotation of the rotor. Further, the holding member functions also as a scattering prevention member and thus the number of components of the can be reduced. As a result, a manufacturing cost of the motor can be reduced. Further, a surface of the recessed part provided in the end face of the magnet is formed in a spherical shape and thus a portion where the recessed part provided in the magnet is prevented or suppressed from being broken.

According to at least an embodiment of the present invention, there may be provided a pump device including the motor described above and an impeller which is attached to the rotation shaft of the rotor.

In at least an embodiment of the present invention, the holding member which holds the magnet of the rotor in the motor functions also as a scattering prevention member. Therefore, even if the magnet is broken, the magnet is prevented or suppressed from scattering and obstructing rotation of the rotor and thus rotation of the impeller is prevented or suppressed from being obstructed. Further, the holding member functions also as a scattering prevention member and thus the number of components of the pump device can be reduced. Therefore, a manufacturing cost of the pump device can be suppressed. Further, the surface of the recessed part provided in the end face of the magnet is formed in a spherical shape and thus a portion where the recessed part provided in the magnet is prevented or suppressed from being broken.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

A pump device and a motor in accordance with at least an embodiment of the present invention will be described below with reference to the accompanying drawings.

(Pump Device)

Figure 1:
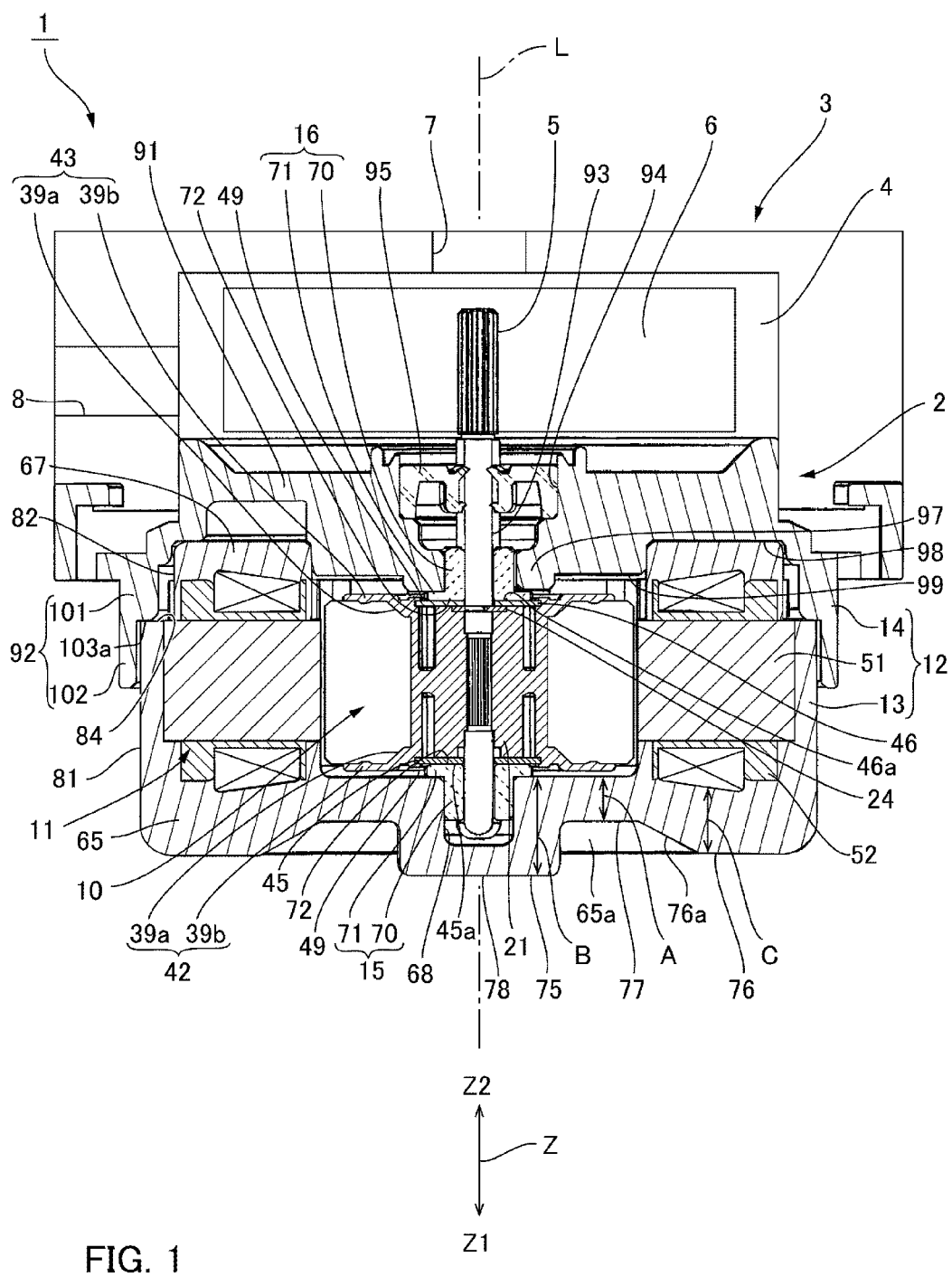
FIG. 1 is a cross-sectional view showing a pump device in accordance with at least an embodiment of the present invention
Figure 2:
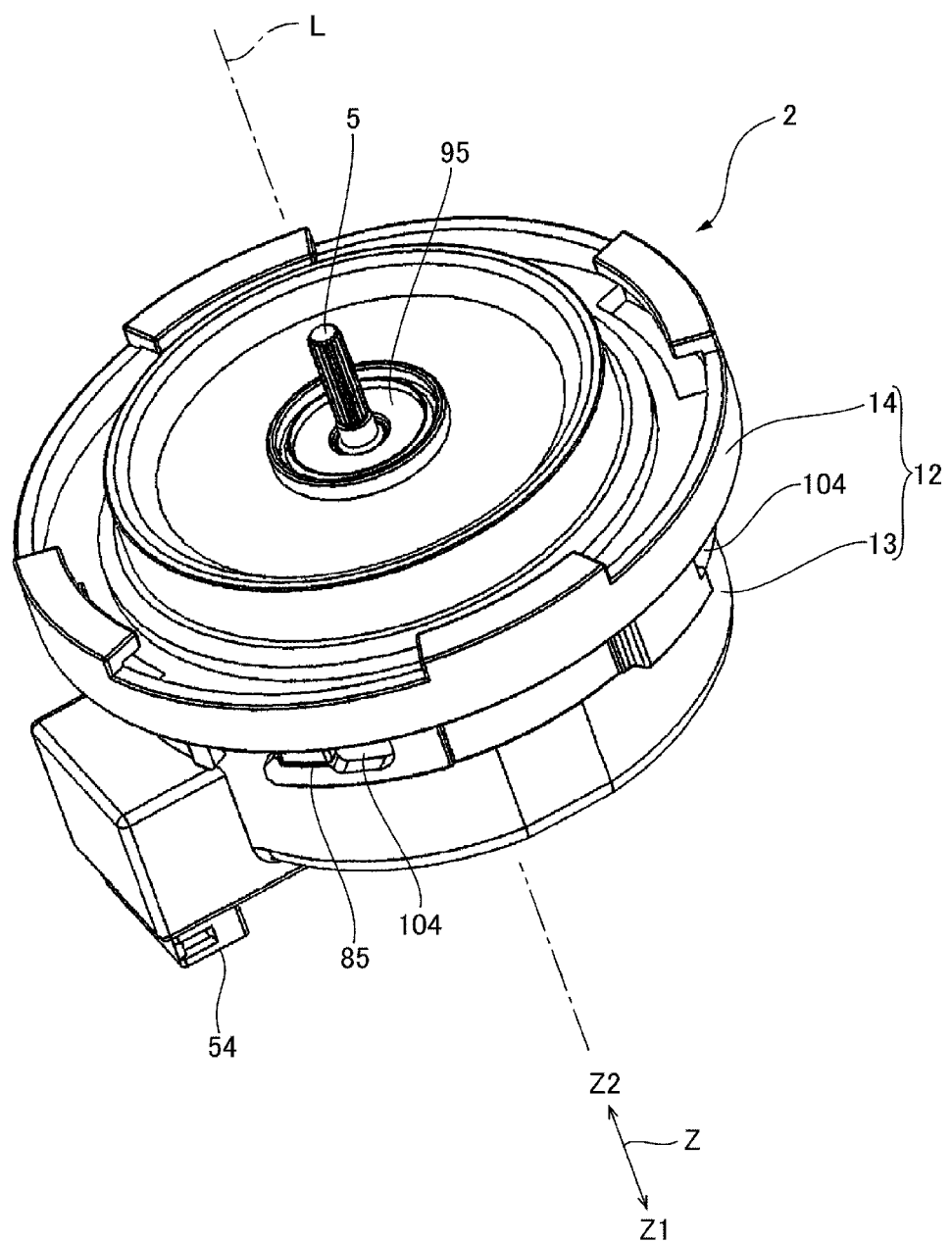
FIG. 2 is a perspective view showing a motor of a pump device which is viewed from a side where a rotation shaft is protruded.
Figure 3:
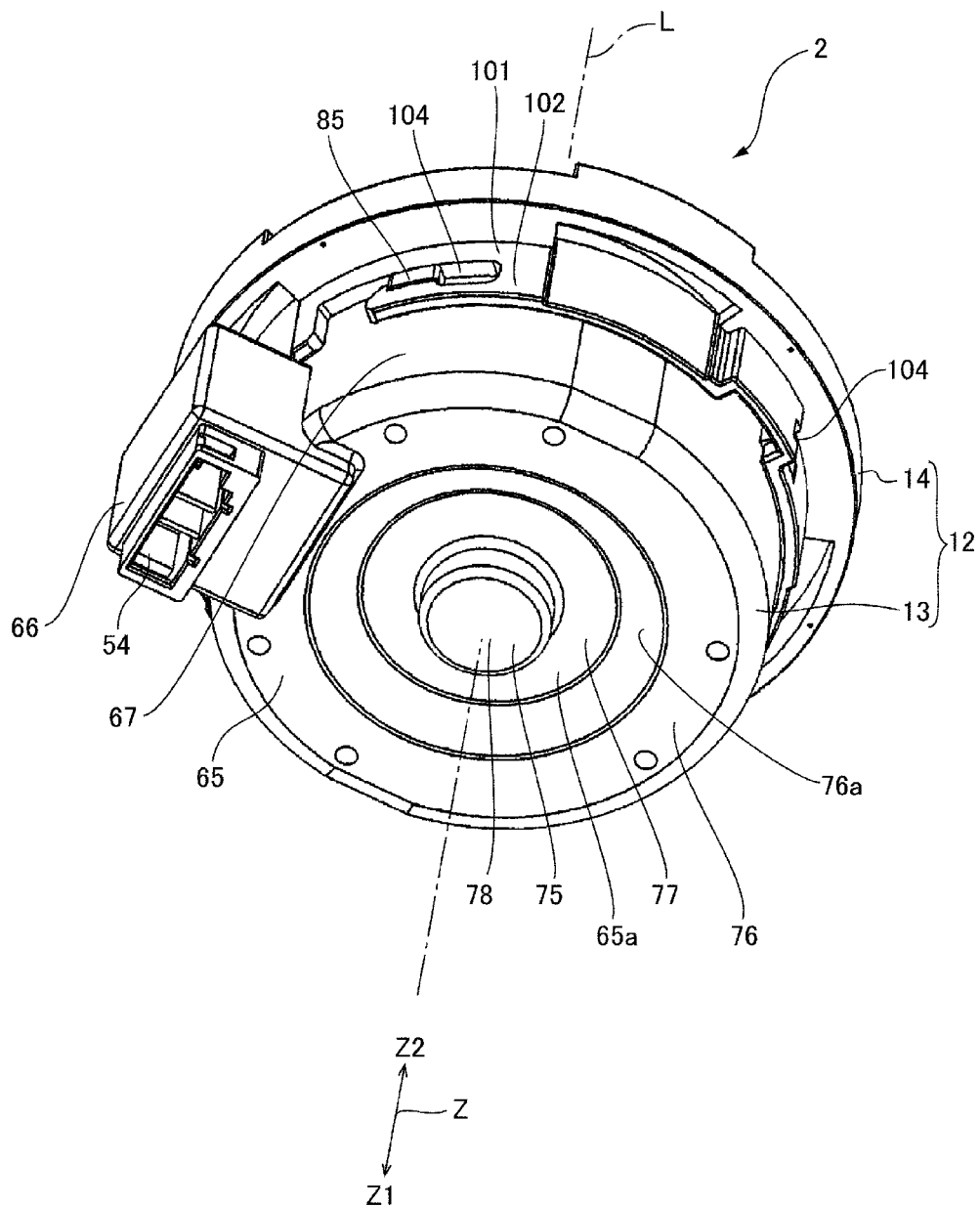
FIG. 3 is a perspective view showing the motor which is viewed from an opposite side to the side where the rotation shaft is protruded.

FIG. 1 is a cross-sectional view showing a pump device in accordance with at least an embodiment of the present invention. FIG. 2 is a perspective view showing a motor as a drive source of a pump device which is viewed from a side where a rotation shaft is protruded. FIG. 3 is a perspective view showing the motor as a drive source of a pump device which is viewed from an opposite side to the side where the rotation shaft is protruded. As shown in FIG. 1, a pump device 1 includes a motor 2, a case body 3 which covers the motor 2, a pump chamber 4 which is formed between the motor 2 and the case body 3, and an impeller 6 which is attached to a rotation shaft 5 of the motor 2 and is disposed in an inside of the pump chamber 4. The case body 3 is formed with an inlet port 7 and an outlet port 8 for a fluid and, when the motor 2 is driven to rotate the impeller 6, a fluid such as water sucked from the inlet port 7 is discharged from the outlet port 8 through the pump chamber 4. In the following descriptions, for convenience, an axial line "L" direction of the rotation shaft 5 is referred to as an upper and lower direction ("Z" direction). Further, one side in the "Z" direction is referred to as a lower side (first direction "Z1")

and the other side is referred to as an upper side (second direction "Z2"). A lower side is a direction directing from the pump chamber 4 to the motor 2, and the lower side is an opposite-to-output side. An upper side is a direction to which the rotation shaft 5 is protruded from the motor 2, and the upper side is an output side. In addition, a direction perpendicular to an axial line "L" is referred to as a radial direction, a circumferential direction is a direction around the axial line "L".

The motor 2 is a DC brushless motor, which includes a rotor 10, a stator 11 and a housing 12 accommodating the rotor 10 and the stator 11. As shown in FIG. 2 and FIG. 3, the housing 12 includes a resin sealing member 13 which covers the stator 11 from a lower side and a cover member 14 which covers the resin sealing member 13 from an upper side. The resin sealing member 13 holds a first bearing member 15 which rotatably supports a lower side portion of the rotation shaft 5. The cover member 14 holds a second bearing member 16 which rotatably supports a middle portion of the rotation shaft 5 of the rotor 10.

(Rotor)

Figure 4:
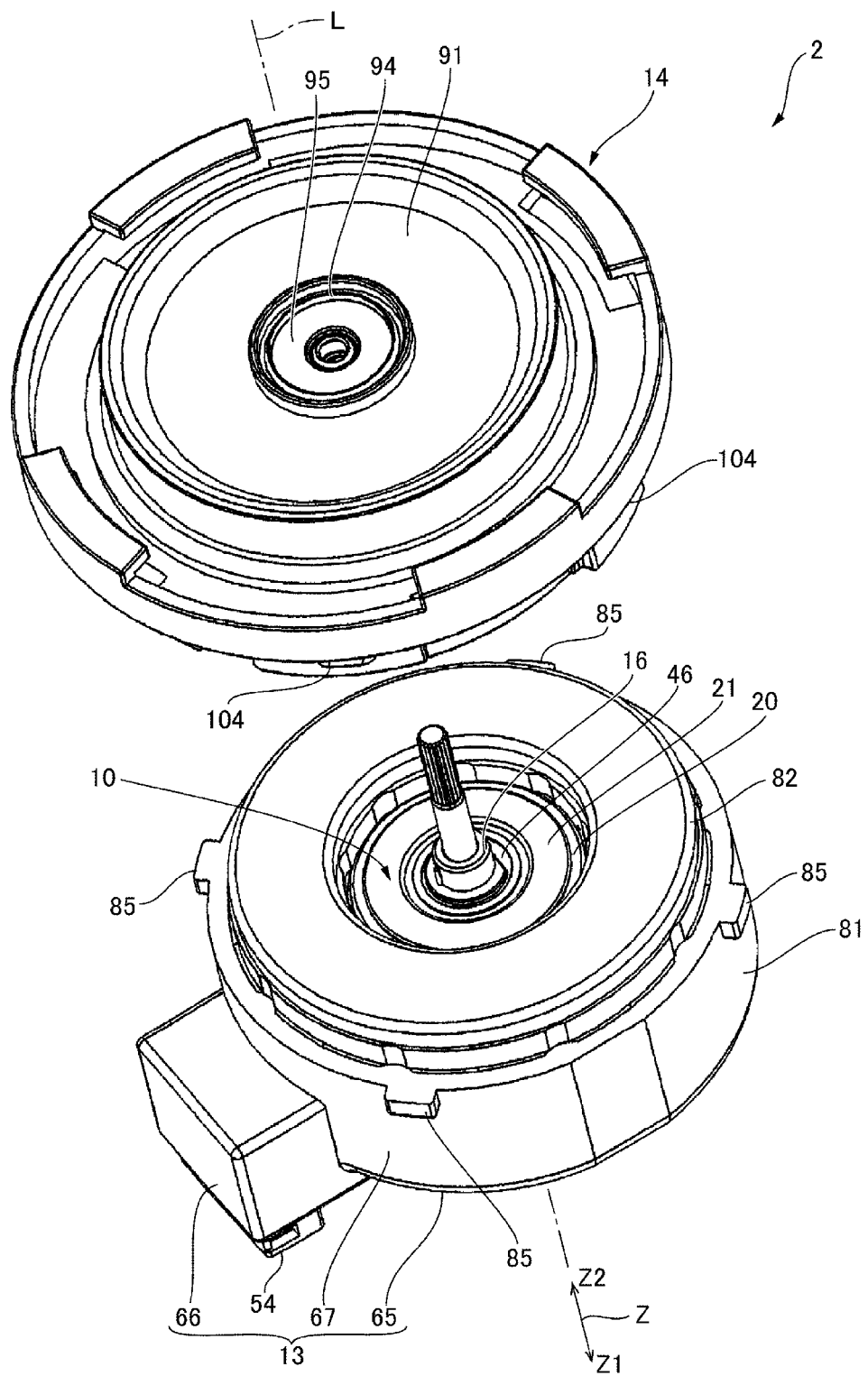
FIG. 4 is an exploded perspective view showing the motor.
Figure 5:
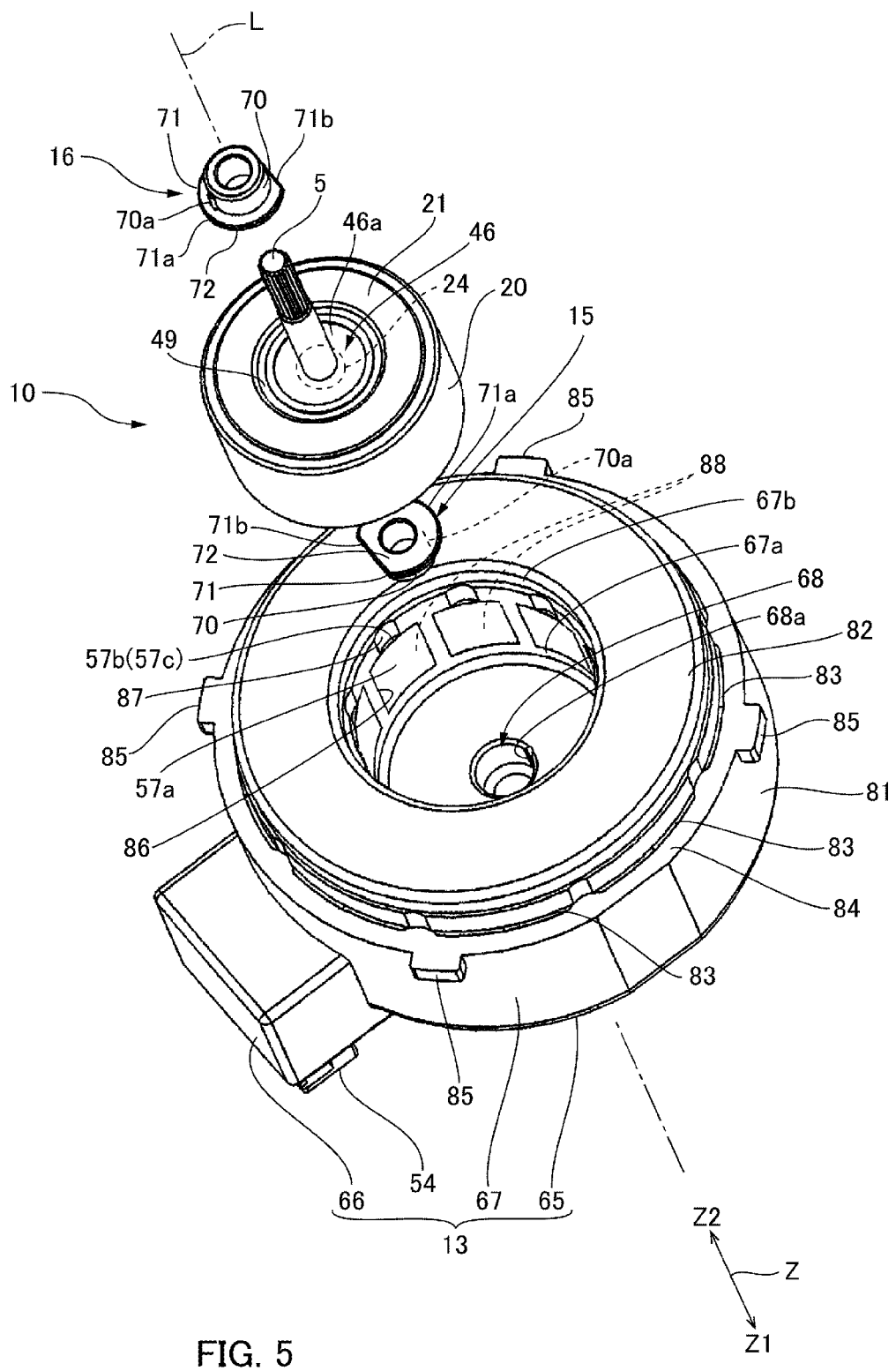
FIG. 5 is an exploded perspective view showing the motor from which a cover member is detached.
Figure 6:
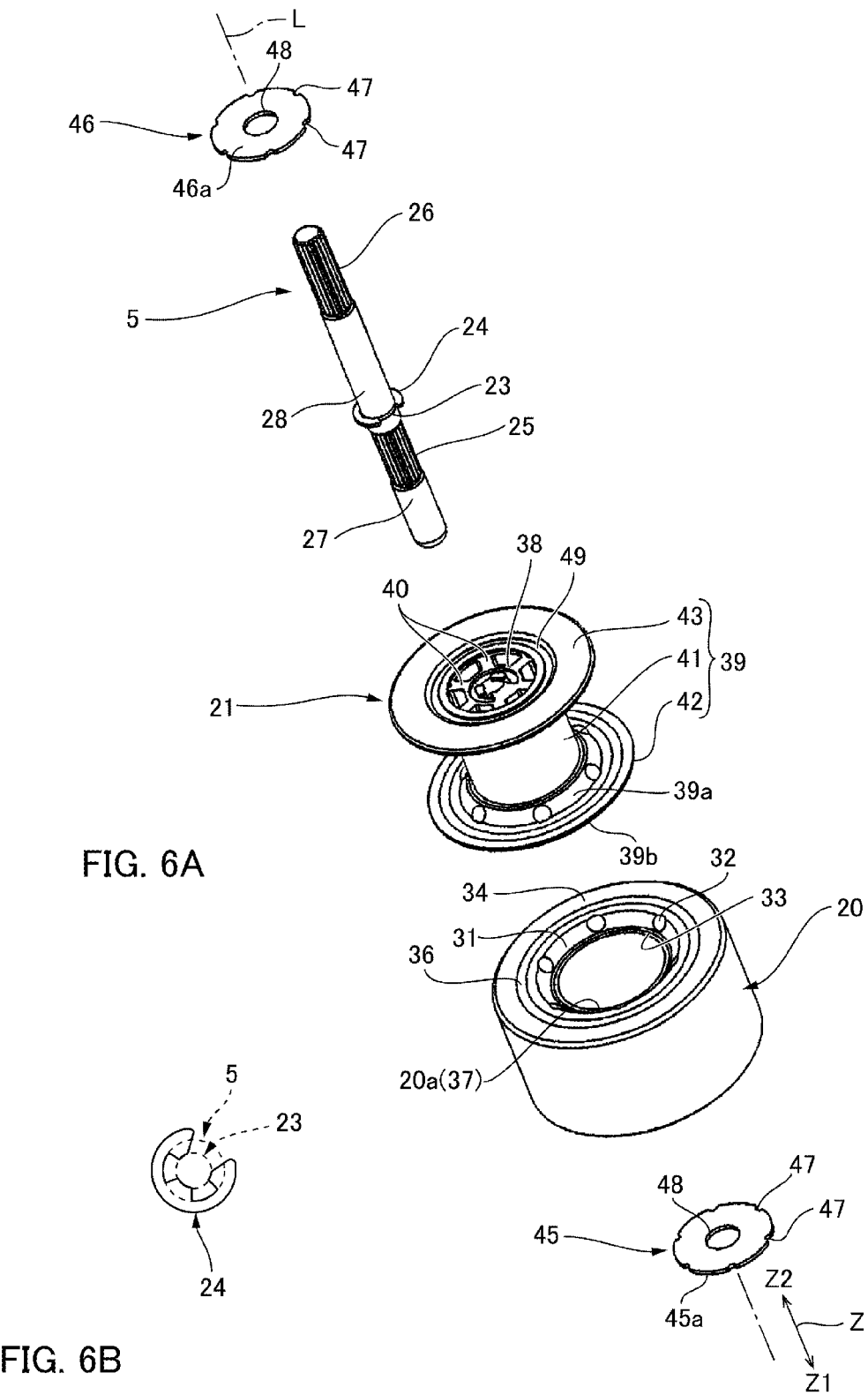
FIG. 6A is an exploded perspective view showing a rotor and FIG. 6B is an explanatory view showing a fixing structure of an "E"-ring.

FIG. 4 is a perspective view showing the motor 2 in a state that the cover member 14 is detached. FIG. 5 is an exploded perspective view showing the motor 2 in which the cover member 14 is not shown. FIG. 6A is an exploded perspective view showing the rotor 10 and FIG. 6B is an explanatory view showing a fixing structure of an "E"-ring to the rotation shaft 5. As shown in FIG. 4 through FIG. 6B, the rotor 10 includes the rotation shaft 5, a magnet 20 surrounding the rotation shaft 5, and a holding member 21 which integrally connects and holds the rotation shaft 5 and the magnet 20.

The rotation shaft 5 is made of stainless steel. As shown in FIG. 6A, the rotation shaft 5 is provided with a ring-shaped groove 23 on a slightly lower side with respect to its center in the upper and lower direction. An "E"-ring 24 is attached to the ring-shaped groove 23. The "E"-ring 24 is a metal plate-shaped member. As shown in FIG. 6B, the "E"-ring 24 is fixed to the ring-shaped groove 23 of the rotation shaft 5 and is protruded to an outer peripheral side from the rotation shaft 5. Further, the rotation shaft 5 is provided with a first knurling formed part 25 having a predetermined length on a lower side with respect to the ring-shaped groove 23. In addition, the rotation shaft 5 is provided with a second knurling formed part 26 having a predetermined length on a lower side from an upper end portion. The second knurling formed part 26 is a portion which is protruded to an upper side from the housing 12 of the motor 2 and is reached to an inside of the pump chamber 4. The second knurling formed part 26 is an attached part to which the impeller 6 is attached. A first supported part 27 which is supported by the first bearing member 15 is provided in the rotation shaft 5 on a lower side of the first knurling formed part 25. A second supported part 28 which is supported by the second bearing member 16 is provided between the ring-shaped groove 23 and the second knurling formed part 26 in the rotation shaft.

The magnet 20 is formed in a ring shape and is coaxially disposed with the rotation shaft 5. The magnet 20 is disposed on an outer peripheral side with respect to the first knurling formed part 25. An "N"-pole and an "S"-pole are alternately magnetized in a circumferential direction on an outer peripheral face of the magnet 20.

As shown in FIG. 6A, an end portion on an inner peripheral side of an upper face of the magnet 20 is formed with a tapered face 31 inclined to a lower side toward an inner peripheral side and a ring-shaped face 33 which is continuously extended to an inner peripheral side from a lower end of the tapered face 31. In addition, similarly to the upper face, an end portion on an inner peripheral side of a lower face of the magnet 20 is formed with a tapered face 31 inclined to an upper side toward the inner peripheral side and a ring-shaped face 33 which is continuously extended to the inner peripheral side from an upper end of the tapered face 31. Each of the upper and lower tapered faces 31 is formed with a plurality of recessed parts 32 at equal angular intervals in the circumferential direction. A surface of each of the recessed parts 32 is formed in a spherical shape.

An outer peripheral side of an upper face of the magnet 20 with respect to the tapered face 31 is formed with a ring-shaped face 34 perpendicular to the axial line "L". The ring-shaped face 34 is provided with a ring-shaped groove 36 which is extended with a constant width in a circumferential direction. A cross sectional shape of the ring-shaped groove 36 which is cut in the radial direction is a circular arc shape. The ring-shaped groove 36 is provided in a substantially center portion of a thickness in the radial direction of the magnet 20 and may be provided on a slightly outer peripheral side or a slightly inner peripheral side with respect to the center of the ring-shaped face 34. In an under face of the magnet 20, similarly to the upper face of the magnet 20, a ring-shaped face 34 which is located on an outer peripheral side of the tapered face 31 is provided with a ring-shaped groove 36 which is extended with a constant width in a circumferential direction. A cross sectional shape cut in the radial direction of the ring-shaped groove 36 provided on the under face is a circular arc shape. The ring-shaped groove 36 provided on the under face is also provided in a substantially center portion of the thickness in the radial direction of the magnet 20 and may be provided on a slightly outer peripheral side or a slightly inner peripheral side with respect to the center of the ring-shaped face 34.

Figure 7:
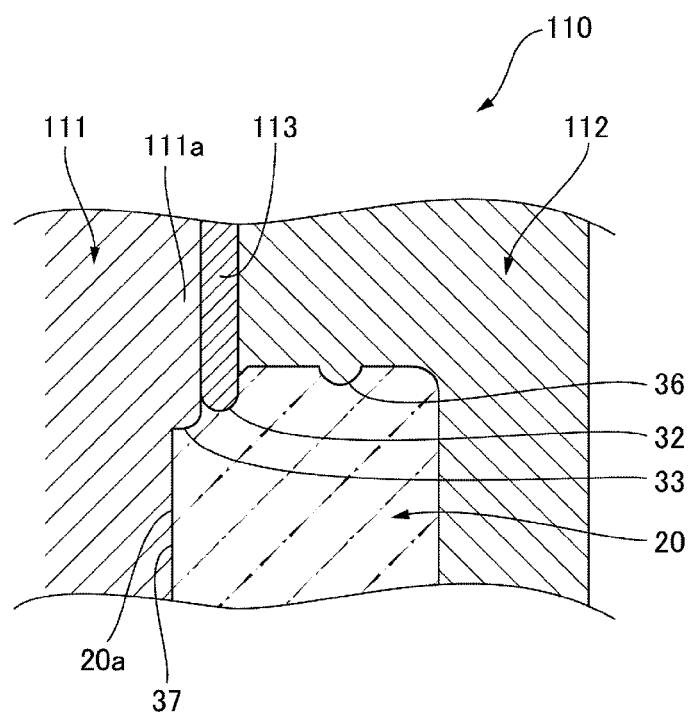
FIG. 7 is an explanatory view showing a forming method of a magnet.

In this embodiment, the magnet 20 is a compression-molded product which is made so that molding material is filled in an inside of a die 110 and pressurized and molded. FIG. 7 is an explanatory view showing a manufacturing method for the magnet 20 and is a cross-sectional view which is cut the die 110 and an upper side portion of the magnet 20 molded in the die 110 by a plane extending in the upper and lower direction so as to pass the recessed part 32 and the ring-shaped groove 36 in the radial direction. As shown in FIG. 7, the die 110 for molding the magnet 20 includes a first die 111 in a circular column shape provided with a face to be transferred to an inner peripheral face 37 of a center hole 20a of the magnet 20 and a second die 112 provided with faces to be transferred to an upper face, an under face and an outer peripheral face of the magnet 20. A plurality of the recessed parts 32 is formed by a plurality of pins 113 which are inserted between the first die 111 and the second die 112. A tip end of the pin 113 is formed in a spherical shape. In this embodiment, a plurality of the recessed parts 32 is provided at positions separated on an outer side in the radial direction from an inner peripheral face of the magnet 20. Therefore, the first die 111 is provided with a protruded portion 111a at a position facing the first pins 113 in the radial direction for separating the respective pins 113 to an outer peripheral side from an inner peripheral face of the magnet 20. As a result, the ring-shaped faces 33 corresponding to the protruded portions 111a of the first die 111 are provided at ends on the inner peripheral sides (inner peripheral sides of the tapered faces 31) of the upper face and the under face of the magnet 20. In other words, the ring-shaped face 33 is formed by transferring a shape of an end part of the protruded portion 111a of the die 110 to the magnet 20.

The holding member 21 is a resin molded product and holds a portion including the first knurling formed part 25 of the rotation shaft 5 from an outer peripheral side. The holding member 21 is formed by insert molding in which the magnet 20 is disposed in an inside of a die and resin is injected. The holding member 21 is formed by insert molding so as to provide with a rotation shaft holding part 38 in a tube shape, a ring-shaped magnet holding part 39 which holds the magnet 20 on an outer peripheral side of the rotation shaft holding part 38, and a plurality of connection parts 40 which are radially extended from the rotation shaft holding part 38 in the radial direction so that the rotation shaft holding part 38 and the magnet holding part 39 are connected with each other. Since the first knurling formed part 25 is provided on the rotation shaft 5, the rotation shaft holding part 38 is integrated with the rotation shaft 5 in a turning prevention state.

The magnet holding part 39 formed by insert molding is provided with a magnet holding tube portion 41 which covers the inner peripheral face 37 of the magnet 20 from an inner peripheral side, a first magnet holding flange portion 42 in a circular ring shape which is enlarged to an outer side from a lower end portion of the magnet holding tube portion 41, and a second magnet holding flange portion 43 in a circular ring shape which is enlarged to an outer side from an upper end portion of the magnet holding tube portion 41. The first magnet holding flange portion 42 covers a lower face portion except an outer peripheral edge portion of the under face of the magnet 20. In other words, the first magnet holding flange portion 42 covers the under face of the magnet 20 to an outer peripheral side with respect to the ring-shaped groove 36. The second magnet holding flange portion 43 covers an upper face portion except an outer peripheral edge portion of the upper face of the magnet 20. In other words, the second magnet holding flange portion 43 covers the upper face of the magnet 20 to an outer peripheral side with respect to the ring-shaped groove 36. The first magnet holding flange portion 42 and the second magnet holding flange portion 43 are provided as scattering prevention members which prevents the magnet 20 from scattering if the magnet 20 is broken. Therefore, each of the first magnet holding flange portion 42 and the second magnet holding flange portion 43 is formed to a position between the ring-shaped groove 36 and an outer peripheral face of the magnet 20. Each of the first magnet holding flange portion 42 and the second magnet holding flange portion 43 is provided with a tapered face cover part 39a which covers the tapered face 31 and a ring-shaped plate part 39b which is located on an outer peripheral side of the tapered face cover part 39a and is overlapped with the ring-shaped face 34. The tapered face cover part 39a is thicker in the upper and lower direction than the ring-shaped plate part 39b. In this embodiment, the first magnet holding flange portion 42 and the second magnet holding flange portion 43 are formed in shapes along the upper face and the under face of the magnet 20 and are adhered to the surfaces of the recessed parts 32 and the surface of the ring-shaped groove 36. The recessed part 32 is formed at equal angular intervals in the circumferential direction and thus the recessed parts 32 function as turning prevention when the magnet holding part 39 is formed by insert molding and the magnet 20 can be surely held by the magnet holding part 39. Further, the ring-shaped groove 36 whose cross section is a circular arc shape is formed so as to have a constant width in the circumferential direction and thus, when the first magnet holding flange portion 42 and the second magnet holding flange portion 43 are formed by insert molding, the resin is adhered to the surface of the ring-shaped groove 36 and an adhered area to the magnet 20 is increased. Therefore, if the magnet 20 is broken, scattering of the magnet 20 is prevented.

The number of the connected parts 40 is the same number of the recessed parts 32 of the magnet 20. The holding member 21 holds the magnet 20 so that the respective recessed parts 32 of the magnet 20 are located on outer sides in the radial direction of the respective connected parts 40. An under face of the connected part 40 is perpendicular to the axial line "L". Further, as shown in FIG. 1, an "E"-ring 24 fixed to the rotation shaft 5 is held in a state that a portion of the "E"-ring 24 protruded to an outer peripheral side from the rotation shaft 5 is embedded in an upper face of the rotation shaft holding part 38. An upper face of the portion of the "E"-ring 24 protruded to an outer peripheral side from the rotation shaft 5 is exposed to an upper side from the rotation shaft holding part 38. The upper face of the "E"-ring 24 and the upper face of the rotation shaft holding part 38 and the upper face of the connected part 40 are located on the same plane which is perpendicular to the axial line "L".

The rotor 10 includes a first bearing plate 45, which is held on a lower end side of the holding member 21, and a second bearing plate 46 which is held on an upper end side of the holding member 21. The first bearing plate 45 and the second bearing plate 46 are circular ring-shaped metal plates. Each of the first bearing plate 45 and the second bearing plate 46 is provided with a plurality of cut-out parts 47 on its outer peripheral edge. As a result, the first bearing plate 45 and the second bearing plate 46 are provided with protrusions and recesses on their outer peripheral edges.

The cut-out part 47 is formed at six positions with equal angular intervals. The respective cut-out parts 47 formed in the first bearing plate 45 and the second bearing plate 46 face the respective connected parts 40 in the upper and lower direction. The first bearing plate 45 is fixed to the holding member 21 in a state that the rotation shaft 5 is penetrated through its center hole 48 and covers the connected parts 40 and the rotation shaft holding part 38 from a lower end side of the holding member 21. As shown in FIG. 1, in a state that the first bearing plate 45 is fixed to the holding member 21, the under face of the first bearing plate 45 is perpendicular to the axial line "L". The second bearing plate 46 is fixed to the holding member 21 in a state that the rotation shaft 5 is penetrated through its center hole 48 and covers the connected parts 40, the rotation shaft holding part 38 and the "E"-ring 24 from an upper side of the holding member 21. In a state that the second bearing plate 46 is fixed to the holding member 21, the second bearing plate 46 is in surface contact with the "E"-ring 24. An upper face of the second bearing plate 46 is perpendicular to the axial line "L". The upper face of the second bearing plate 46 is a rotor side sliding face 46a which slides on the second bearing member 16 from a lower side.

In this embodiment, the holding member 21 is formed by insert molding in which a rotation shaft 5 to which an "E"-ring 24 is attached and a magnet 20 are disposed in an inside of a die and resin is injected. The first bearing plate 45 and the second bearing plate 46 are held by the holding member 21 after insert molding.

When the first bearing plate 45 is to be held by the holding member 21, the rotation shaft 5 is penetrated through a center hole 48 of the first bearing plate 45 and the first bearing plate 45 is overlapped with the connected parts 40 on the lower end side of the holding member 21 and the rotation shaft holding part 38 on the lower end side of the holding member 21. After that, a portion of the holding member 21 located on an outer peripheral side of the first bearing plate 45 is plastically deformed by heat and covers an outer peripheral side portion of the under face of the first bearing plate 45 and, in addition, the resin is made enter into the respective cut-out parts 47. In this manner, the under face of the holding member 21 is provided with a plastically deformed part 49 in a ring shape which covers an outer peripheral edge of the first bearing plate 45 from a lower side and an outer periphery side. The first bearing plate 45 is held by the connected parts 40 and the rotation shaft holding part 38 on the lower end side of the holding member 21 and the plastically deformed part 49. Similarly, when the second bearing plate 46 is to be held by the holding member 21, the rotation shaft 5 is penetrated through a center hole 48 of the second bearing plate 46 and the second bearing plate 46 is overlapped with the connected parts 40 on the upper end side of the holding member 21 and the rotation shaft holding part 38 on its upper end side, and an under face of the second bearing plate 46 is in surface contact with an upper face of the "E"-ring 24. After that, a portion of the holding member 21 located on an outer peripheral side of the second bearing plate 46 is plastically deformed by heat and covers an outer peripheral side portion of the upper face of the second bearing plate 46 and, in addition, the resin is made enter into the respective cut-out parts 47. In this manner, the upper face of the holding member 21 is provided with a plastically deformed part 49 in a ring shape which covers an outer peripheral edge of the second bearing plate 46 from an upper side and an outer periphery side. The second bearing plate 46 is held by the connected parts 40, the rotation shaft holding part 38 on the upper end side of the holding member 21 and the upper face of the "E"-ring 24, and the plastically deformed part 49.

(Stator)

Figure 8:
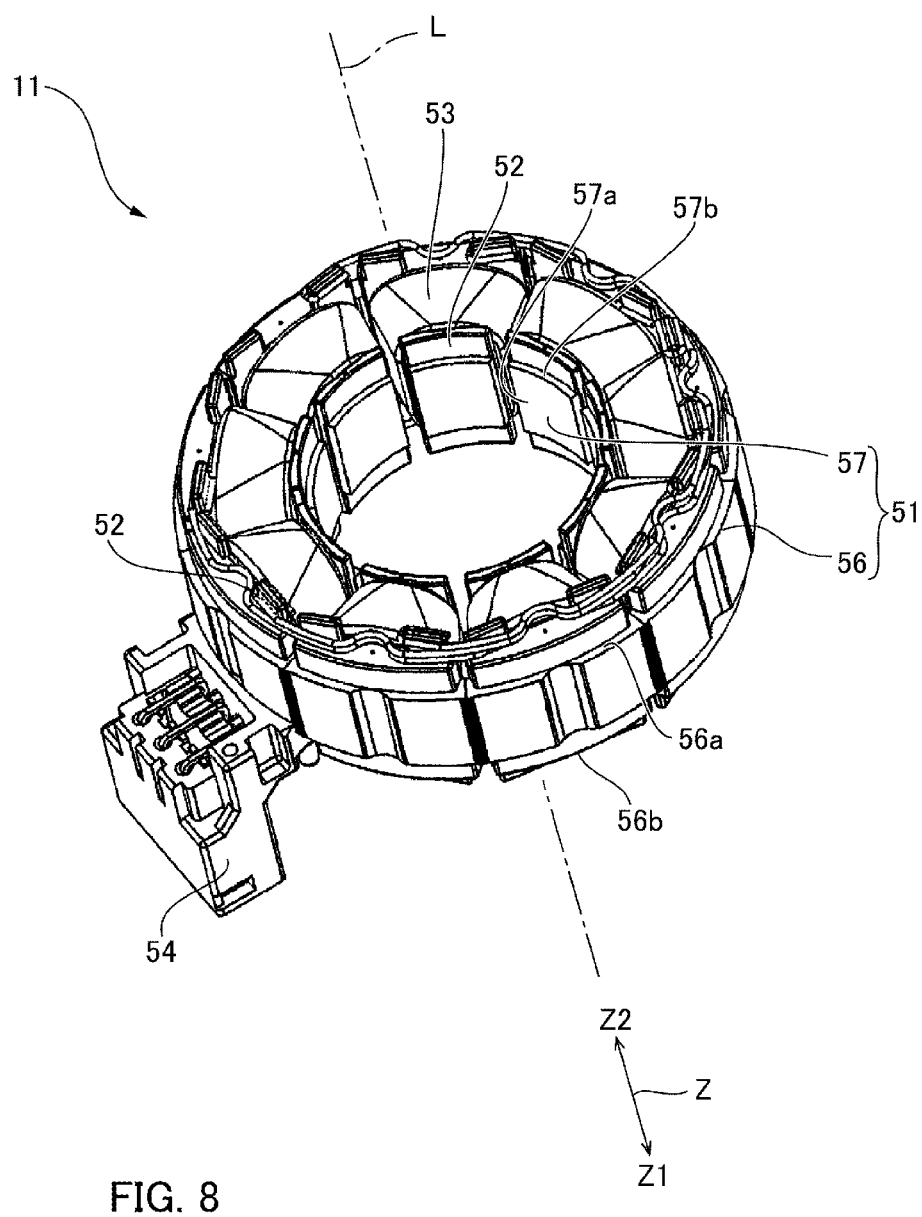
FIG. 8 is a perspective view showing a stator.

FIG. 8 is a perspective view showing a stator 11. The stator 11 includes a ring-shaped stator core 51 located on an outer peripheral side with respect to the rotor 10, a plurality of coils 53 wound around the stator core 51 through insulators 52, and a connector 54 for connecting power feeding wires structured to supply electrical power to the respective coils 53.

The stator core 51 is a laminated core which is formed by laminating thin magnetic plates made of magnetic material. As shown in FIG. 8, the stator core 51 is provided with a ring-shaped part 56 and a plurality of salient pole parts 57 which are protruded to an inner side in the radial direction from the ring-shaped part 56. The plurality of the salient pole parts 57 is formed at equal angular pitches and is disposed at a constant pitch in the circumferential direction. In this embodiment, the plurality of the salient pole parts 57 is formed at an angular pitch of 40° with the axial line "L" as a center. Therefore, the stator core 51 is provided with nine salient pole parts 57. An inner peripheral side end face 57a of the salient pole part 57 is a circular arc face with the axial line "L" as a center, and the inner peripheral side end face 57a faces an outer peripheral face of the magnet 20 of the rotor 10 through a slight gap space.

Each of the insulators 52 is formed of insulating material such as resin. Each of the insulators 52 is formed in a tube shape with flanges which is provided with flange parts at both ends in the radial direction. The insulator 52 is attached to the salient pole part 57 so that an axial direction of the insulator 52 formed in a tube shape and the radial direction of the stator 11 are coincided with each other. Each of the coils 53 is wound around each of the plurality of the salient pole parts 57 through the insulator 52. Each of the coils 53 wound around the insulator 52 is protruded to the upper and lower direction toward an outer side in the radial direction. In this embodiment, the insulator 52 partially covers an upper face of the ring-shaped part 56 of the stator core 51, and an outer peripheral edge portion 56a of the upper face of the ring-shaped part 56 is not covered with the insulator 52. Similarly, the insulator 52 partially covers a lower face of the ring-shaped part 56 of the stator core 51, and an outer peripheral edge portion 56b of the lower face of the ring-shaped part 56 is not covered with the insulator 52.

A tip end portion of each of the salient pole parts 57 is protruded to an inner peripheral side from the insulator 52. A portion of each of the salient pole parts 57 which is exposed to the inner peripheral side from the insulator 52 (a portion between an inner peripheral side end face 57a and a portion around which the coil 53 is wound) is provided with an axial direction end face 57b which is perpendicular to the axial line "L". One of the plurality of the insulators 52 is integrally formed with the connector 54 with which wiring lines for supplying electrical power to the coils 53 are detachably connected.

(Resin Sealing Member)

As shown in FIG. 5, the resin sealing member 13 is provided with a sealing member bottom part 65 in a disk shape which covers the coils 53, the insulators 52 and the stator core 51 from a lower side. Further, the resin sealing member 13 is provided with a sealing member projecting part 66 which is extended to an outer peripheral side from the sealing member bottom part 65 to cover the connector 54, and a sealing member tube part 67 which is extended to an upper side from the sealing member bottom part 65 to cover the coils 53, the insulators 52 and the stator core 51.

A center portion of an upper face of the sealing member bottom part 65 is provided with a bearing member holding recessed part 68. The bearing member holding recessed part 68 holds the first bearing member 15 which rotatably supports the rotor 10 on a lower side with respect to the magnet 20 of the rotation shaft 5. The bearing member holding recessed part 68 is a circular recessed part which is provided with a groove 68a extending in the upper and lower direction in a part in a circumferential direction of an inner peripheral face of the recessed part.

The first bearing member 15 is made of resin and is provided with a tube-shaped support part 70 having a through hole through which the rotation shaft 5 is penetrated, and a flange part 71 which is enlarged from an upper side end of the support part 70 to an outer peripheral side. A protruded part 70a extending with a constant width in the upper and lower direction is formed in a part in the circumferential direction of an outer peripheral face of the support part 70. A contour of the flange part 71 is, when viewed in the upper and lower direction, a "D"-character shape which is provided with a circular arc contour portion 71a in a circular arc shape and a straight contour portion 71b which linearly connects one end with the other end in the circumferential direction of the circular arc contour portion 71a. The straight contour portion 71b is located on an opposite side to the protruded part 70a with the through hole therebetween.

The support part 70 of the first bearing member 15 is inserted into the bearing member holding recessed part 68 in a state that a position of the protruded part 70a of the support part 70 and a position of the groove 68a of the bearing member holding recessed part 68 are coincided with each other. Further, as shown in FIG. 1, the first bearing member 15 is inserted from an upper side until the flange part 71 is abutted with the sealing member bottom part 65 and then the first bearing member 15 is fixed to the bearing member holding recessed part 68. In a state that the first bearing member 15 is fixed to the bearing member holding recessed part 68, an upper end face of the flange part 71 is perpendicular to the axial line. In this embodiment, the support part 70 functions as a radial bearing for the rotation shaft 5 and the flange part 71 functions as a thrust bearing for the rotor 10. In other words, the upper end face of the flange part 71 is a sliding face 72 on which the rotor 10 slidably contacts. The sliding face 72 of the first bearing member 15 slidably contacts with the under face of the first bearing plate 45 which is fixed to the holding member 21 of the rotor 10. In other words, the under face of the first bearing plate 45 is a rotor side sliding face 45a which slidably contacts with the sliding face 72 of the first bearing member 15. In this embodiment, grease is applied to the sliding face 72.

As shown in FIG. 3, the sealing member bottom part 65 is provided with a bearing support portion 75 in a tube shape which surrounds the first bearing member 15 from an outer peripheral side in the radial direction, a coil sealing portion 76 located on a lower side of the coils 53, a connecting portion 77 which connects the bearing support portion 75 with the coil sealing portion 76, and a circular closing portion 78 which closes a lower end opening of the tube shaped bearing support portion 75. The bearing support portion 75 and the closing portion 78 structure the bearing member holding recessed part 68 and an inner peripheral face of the bearing support portion 75 is an inner peripheral face of the bearing member holding recessed part 68. An under face of the coil sealing portion 76 is provided with a tapered face portion 76a which is inclined to a lower side toward an outer peripheral side according to the shapes of the respective coils 53 wound around the insulators 52.

As shown in FIG. 1, a thickness "A" in the axial line "L" direction of the connected portion 77 is thinner than a thickness "B" of the bearing support portion 75 and a thickness "C" of the coil sealing portion 76. Further, an under face of the connected portion 77 is located on an upper side with respect to an under face of the bearing support portion 75 and an under face of the coil sealing portion 76. Therefore, as shown in FIG. 3, the under face of the sealing member bottom part 65 (resin sealing member 13) is formed with a ring-shaped recessed part 65a whose bottom face is the under face of the connected portion 77. Further, the under faces of the bearing support portion 75 and the closing portion 78 are located on a lower side with respect to the under face of the coil sealing portion 76. In other words, the bearing support portion 75 and the closing portion 78 which hold the first bearing member 15 are protruded to a lower side with respect to the coil sealing portion 76.

The sealing member tube part 67 is, as shown in FIG. 4 and FIG. 5, provided from a lower side toward an upper side with a large diameter tube portion 81 and a small diameter tube portion 82 whose outer diameter dimension is smaller than the large diameter tube portion 81. As shown in FIG. 1, an outer diameter of the large diameter tube portion 81 is larger than an outer diameter of the ring-shaped part 56 of the stator core 51, and an outer diameter of the small diameter tube portion 82 is smaller than an outer diameter of the ring-shaped part 56 of the stator core 51.

As shown in FIG. 5, a boundary portion of the large diameter tube portion 81 and the small diameter tube portion 82 in the sealing member tube part 67 is provided with a plurality of circular arc-shaped opening parts 83 which expose an outer peripheral edge portion 56a of the ring-shaped part 56 of the stator core 51 to an upper side from the resin sealing member 13. Further, a ring-shaped end face 84 perpendicular to the axial line "L" is provided on an outer peripheral side of the circular arc-shaped opening part 83 in the resin sealing member 13. An outer peripheral edge portion of the stator core 51 exposed from the circular arc-shaped opening part 83 and the ring-shaped end face 84 are located on the same plane perpendicular to the axial line "L". An upper end portion of the large diameter tube portion 81 is provided with four engaging projections 85 which are protruded to an outer peripheral side with equal angular intervals.

An inner peripheral face of the sealing member tube part 67 is provided from a lower side toward an upper side with a small diameter inner peripheral face portion 67a and a large diameter inner peripheral face portion 67b whose inner diameter dimension is larger than the small diameter inner peripheral face portion 67a. A curvature radius of the small diameter inner peripheral face portion 67a is substantially equal to a curvature radius of the inner peripheral side end face 57a of the salient pole part 57. The small diameter inner peripheral face portion 67a is provided with a plurality of opening parts 86 which expose the inner peripheral side end faces 57a of the respective salient pole parts 57 of the stator core 51 to an inner peripheral side. Further, the small diameter inner peripheral face portion 67a is provided with cut-out parts 87 each of which exposes a part of the axial direction end face 57b of each of the salient pole parts 57 to an upper side. In other words, nine cut-out parts 87 are formed in the small diameter inner peripheral face portion 67a at an angular pitch of 40° with the axial line "L" as a center. The cut-out part 87 is a groove which is extended in the upper and lower direction from an edge of the opening part 86 to an upper end edge of the small diameter inner peripheral face portion 67a. Since the plurality of the cut-out parts 87 is provided, a center portion in the circumferential direction of a tip end portion of the axial direction end face 57b of each of the salient pole parts 57 is formed to be an exposed portion 57c which is exposed to the upper side.

The inner peripheral side end face 57a of each of the salient pole parts 57 which is exposed from the opening part 86 is continuously formed with the small diameter inner peripheral face portion 67a without a step. The inner peripheral side end face 57a of each of the salient pole parts 57 which is exposed from the opening part 86 is applied with an anti-rust agent 88. Further, an anti-rust agent 88 is also applied to the exposed portion 57c of the axial direction end face 57b of each of the salient pole parts 57 which is exposed from the cut-out part 87. In this embodiment, an epoxy paint is used as the anti-rust agent 88. In accordance with an embodiment of the present invention, other paints except an epoxy paint or rust preventive oil may be used as the anti-rust agent 88. Alternatively, an adhesive may be used as the anti-rust agent 88.

The resin sealing member 13 is formed of BMC (Bulk Molding Compound). In this embodiment, the resin sealing member 13 is formed so that the stator 11 is disposed in an inside of a die and resin is injected into the die and cured. In other words, the resin sealing member 13 is integrally molded with the stator 11 by insert molding.

In this embodiment, the inner peripheral side end faces 57a of the respective salient pole parts 57 of the stator core 51 are exposed from the resin sealing member 13. Therefore, a die portion in a circular column shape is provided in the die for insert molding and, when an outer peripheral face of the die portion is abutted with the inner peripheral side end faces 57a of the respective salient pole parts 57, the stator core 51 is positioned in a radial direction. Further, the resin sealing member 13 exposes a part (exposed portion 57c) of the axial direction end face 57b of each of the salient pole parts 57 of the stator core 51 to an upper side. In addition, the resin sealing member 13 exposes the outer peripheral edge portion 56a of the ring-shaped part 56 of the stator core 51 to an upper side. Therefore, in order to perform insert molding, the die is provided with first abutting portions, which are capable of abutting with the axial direction end faces 57b of the respective salient pole parts 57 from an upper side, and a second abutting portion which is capable of abutting with the outer peripheral edge portion of the ring-shaped part 56 from an upper side. When the first abutting portions and the second abutting portion are abutted with the stator core 51, the stator core 51 is positioned in the axial line "L" direction. In other words, in this embodiment, the resin sealing member 13 is molded by injecting resin into the die in a state that the stator core 51 disposed in an inside of the die is positioned in the radial direction and the axial line "L" direction. As a result, accuracy of a relative position of the stator core 51 to the resin sealing member 13 is improved.

In this embodiment, the cut-out parts 87 provided on the inner peripheral face of the sealing member tube part 67 are traces of the first abutting portions provided in the die. In other words, the first abutting parts provided in the die are abutted with the axial direction end faces 57b of the respective salient pole parts 57 in the axial line "L" direction for insert molding and thus, when the BMC is solidified and the resin sealing member 13 is formed, as a result, the portions where the first abutting parts are abutted are formed to be exposed portions 57c and the portions where the first abutting parts are located are formed to be cut-out parts 87.

(Cover Member)

Figure 9:
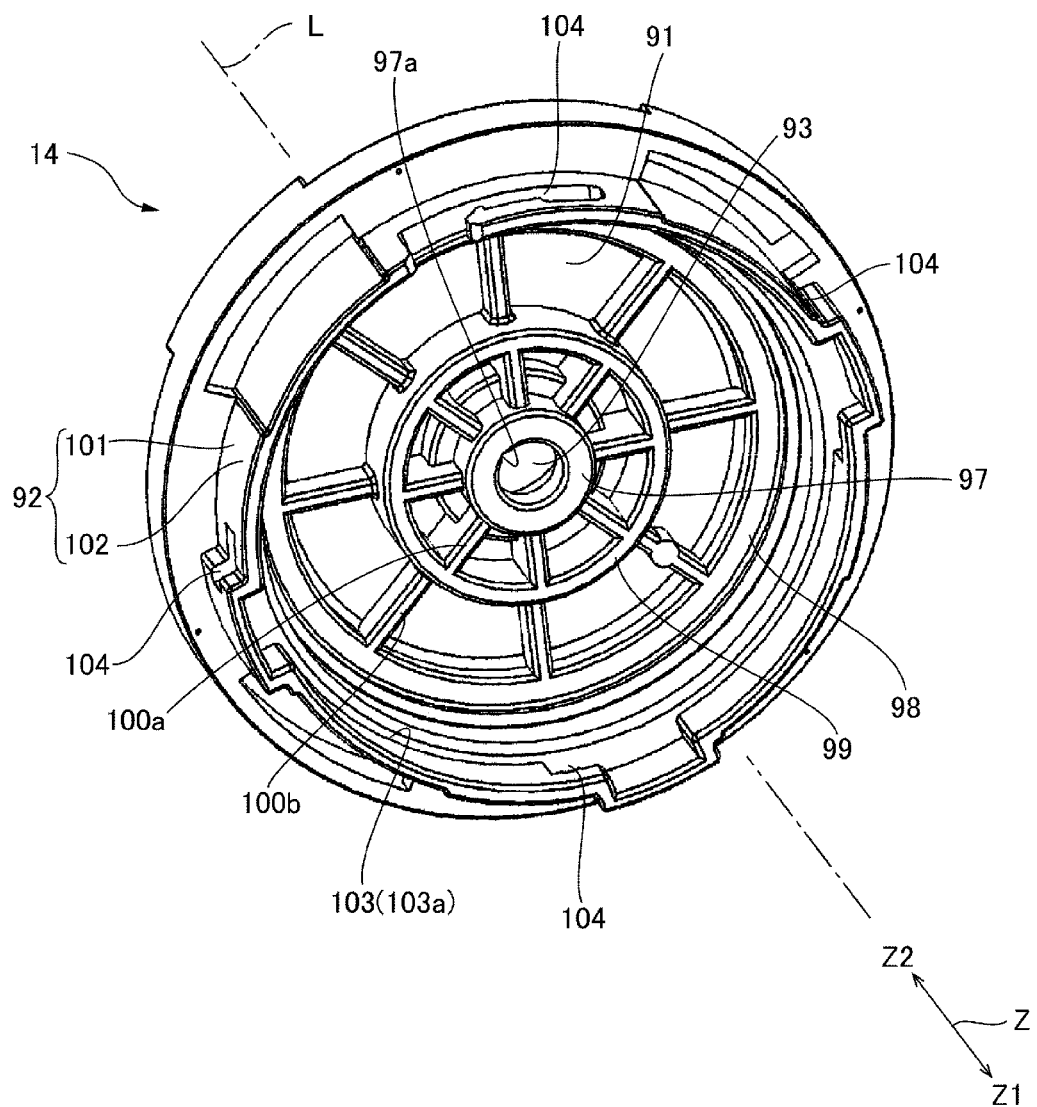
FIG. 9 is a perspective view showing a cover member.

FIG. 9 is a perspective view showing the cover member 14 which is viewed from a lower side. The cover member 14 is made of resin and is fixed to an upper side of the resin sealing member 13.

The cover member 14 is provided with a cover member ceiling part 91 in a circular plate shape and a cover member tube part 92 which is extended to a lower side from the cover member ceiling part 91. The cover member ceiling part 91 is provided with a through hole 93 which is penetrated in the upper and lower direction at its center. As shown in FIG. 1 and FIG. 4, a center portion of an upper face of the cover member ceiling part 91 is provided with a circular recessed part 94 which surrounds the through hole 93. A circular ring-shaped sealing member 95 is disposed in the circular recessed part 94.

As shown in FIG. 9, an under face of the cover member ceiling part 91 is provided at its center portion with a bearing member holding tube part 97 which is coaxial with the through hole 93. Further, the under face of the cover member ceiling part 91 is provided with an outer side ring-shaped rib 98 along a circular outer peripheral edge. In addition, the under face of the cover member ceiling part 91 is provided with a circular inner side ring-shaped rib 99 between the bearing member holding tube part 97 and the outer side ring-shaped rib 98. Inner side ribs 100a are radially provided between the bearing member holding tube part 97 and the inner side ring-shaped rib 99 so as to be extended from the bearing member holding tube part 97 to the inner side ring-shaped rib 99. Outer side ribs 100b are radially provided between the inner side ring-shaped rib 99 and the outer side ring-shaped rib 98 so as to be extended from the inner side ring-shaped rib 99 to the outer side ring-shaped rib 98. The bearing member holding tube part 97, the outer side ring-shaped rib 98 and the inner side ring-shaped rib 99 are coaxially formed with each other. A lower end face of the bearing member holding tube part 97, a lower end face of the outer side ring-shaped rib 98, and a lower end face of the inner side ring-shaped rib 99 are flat faces perpendicular to the axial line "L". A protruding amount of the bearing member holding tube part 97 from the under face of the cover member ceiling part 91 is larger than a protruding amount of the inner side ring-shaped rib 99 from the under face of the cover member ceiling part 91. The protruding amount of the inner side ring-shaped rib 99 from the under face of the cover member ceiling part 91 is larger than a protruding amount of the outer side ring-shaped rib 98 from the under face of the cover member ceiling part 91. Under faces of the outer side ribs 100b and an under face of the outer side ring-shaped rib 98 are formed to be the same plane.

As shown in FIG. 9, the bearing member holding tube part 97 is provided with a groove 97a extending in the upper and lower direction in a part in the circumferential direction of an inner periphery wall of the center hole. Further, as shown in FIG. 1, the second bearing member 16 is held by a center hole of the bearing member holding tube part 97.

In this embodiment, the second bearing member 16 is arranged so that the same member as the first bearing member 15 is disposed upside-down. The second bearing member 16 is made of resin and, as shown in FIG. 5, is provided with a tube-shaped support part 70 having a through hole through which the rotation shaft 5 is penetrated, and a flange part 71 which is enlarged to an outer peripheral side from a lower side end of the support part 70. A protruded part 70a with a constant width which is extended in the upper and lower direction is formed in a part in a circumferential direction of an outer peripheral face of the support part 70. A contour of the flange part 71 is, when viewed in the upper and lower direction, a "D"-character shape which is provided with a circular arc contour portion 71a in a circular arc shape and a straight contour portion 71b which linearly connects one end with the other end in the circumferential direction of the circular arc contour portion 71a. The straight contour portion 71b is located on an opposite side to the protruded part 70a with the through hole therebetween.

The support part 70 of the second bearing member 16 is inserted into the bearing member holding tube part 97 in a state that a position of the protruded part 70a of the support part 70 and a position of the groove 97a of the bearing member holding tube part 97 are coincided with each other. Further, as shown in FIG. 1, the second bearing member 16 is inserted from a lower side until the flange part 71 is abutted with the cover member 14 (the cover member ceiling part 91, the under face of the bearing member holding tube part 97) and is fixed to the bearing member holding tube part 97. An upper end face of the flange part 71 is perpendicular to the axial line in a state that the second bearing member 16 is fixed to the bearing member holding tube part 97. In this embodiment, the support part 70 functions as a radial bearing for the rotation shaft 5 and the flange part 71 functions as a thrust bearing for the rotor 10. In other words, the lower end face of the flange part 71 is a sliding face 72 on which the rotor 10 slidably contacts. The sliding face 72 of the second bearing member 16 is slidably contacted with an upper face of the second bearing plate 46 which is fixed to the holding member 21 of the rotor 10. In other words, the upper face of the second bearing plate 46 is a rotor side sliding face 46a which slidably contacts with the sliding face 72 of the second bearing member 16. In this embodiment, grease is applied to the sliding face 72.

As shown in FIG. 1, the cover member tube part 92 is extended to a lower side from an outer peripheral side with respect to the outer side ring-shaped rib 98. The cover member tube part 92 is provided with an upper side ring-shaped tube portion 101 which is overlapped with the small diameter tube portion 82 of the resin sealing member 13 to cover it from an outer peripheral side, and a lower side ring-shaped tube portion 102 which is located on an outer peripheral side with respect to the large diameter tube portion 81 on a lower side of the upper side ring-shaped tube portion 101. As shown in FIG. 9, a ring-shaped step part 103 is provided on an inner peripheral face of the cover member tube part 92 between the upper side ring-shaped tube portion 101 and the lower side ring-shaped tube portion 102. The ring-shaped step part 103 is provided with a ring-shaped face 103a facing a lower side. The ring-shaped face 103a is a flat face which is perpendicular to the axial line "L". The lower side ring-shaped tube portion 102 is provided with an engaged part 104 which is engaged with the engaging projection 85 of the resin sealing member 13 at four positions in the circumferential direction.

In this embodiment, the resin sealing member 13 is covered with the cover member 14 from an upper side in a state that the rotor 10 is disposed on an inner side of the resin sealing member 13 and the rotor 10 is supported by the first bearing member 15. When the resin sealing member 13 is to be covered with the cover member 14, an adhesive is applied to an outer peripheral edge portion of an upper face of the resin sealing member 13.

When the resin sealing member 13 is to be covered with the cover member 14, as shown in FIG. 1, a lower end portion of the inner side ring-shaped rib 99 is fitted into an inner peripheral side of the sealing member tube part 67 of the resin sealing member 13. As a result, the cover member 14 and the resin sealing member 13 are positioned each other in the radial direction, and the axial line "L" of the rotation shaft 5 and the center axial line of the stator 11 are coincided with each other. Further, the ring-shaped face 103a of the ring-shaped step part 103 of the cover member tube part 92 is abutted with the ring-shaped end face 84 between the large diameter tube portion 81 and the small diameter tube portion 82 of the resin sealing member 13. As a result, the cover member 14 and the resin sealing member 13 are positioned each other in the axial line "L" direction. After that, the cover member 14 and the resin sealing member 13 are relatively turned in the circumferential direction and, as shown in FIG. 3, the engaging projections 85 of the resin sealing member 13 and the engaged parts 104 of the cover member 14 are engaged with each other. As a result, the cover member ceiling part 91 covers the rotor 10 and the resin sealing member 13 from an upper side in a state that the rotation shaft 5 is penetrated in the upper and lower direction. Further, the sealing member 95 which is disposed in the circular recessed part 94 of the cover member ceiling part 91 seals between the rotation shaft 5 and the cover member 14 and the second bearing member 16. In addition, the upper side ring-shaped tube portion 101 of the cover member tube part 92 surrounds the small diameter tube portion 82 of the resin sealing member 13 from an outer peripheral side.

In this embodiment, the cover member 14 is covered with the case body 3 from an upper side. As a result, a space sectioned between the cover member 14 and the case body 3 is formed to be a pump chamber 4. An inlet port 7 is provided in the case body 3 at a position overlapping with the axial line "L" of the rotation shaft 5 of the motor 2. An outlet port 8 is provided on an outer side in the radial direction of the rotation shaft 5. When the impeller 6 is rotated by the motor 2, a fluid is sucked through the inlet port 7 and is discharged from the outlet port 8.

Operations and Effects

According to this embodiment, a plurality of the recessed parts 32 for preventing turning and enhancing adhesion property to the holding member 21 is formed on the upper and lower end faces of the magnet 20 and the magnet holding flange portions 42 and 43 of the holding member 21 partially covering the end faces of the magnet 20 are adhered to the entire surfaces of the recessed parts 32. Therefore, the magnet holding flange portions 42 and 43 of the holding member 21 which integrally holds the magnet 20 with respect to the rotation shaft 5 function as a scattering prevention member for preventing the magnet 20 from scattering if the magnet 20 is broken. Accordingly, a dedicated member for preventing the magnet 20 from scattering is not required to be attached to the magnet 20 and thus the number of components of the rotor 10 is decreased. As a result, a manufacturing cost of the rotor 10 can be decreased and a manufacturing cost of the motor can be decreased. Therefore, a manufacturing cost of the pump device 1 can be decreased. Further, a surface of the recessed part 32 provided in the end face of the magnet 20 is formed in a spherical shape and thus a portion where the recessed part 32 provided in the magnet 20 is prevented or suppressed from being broken.

In addition, a plurality of the recessed parts 32 is provided on an inner peripheral side of the end face of the magnet 20. Therefore, a magnetic field of an outer peripheral face of the magnet 20 is suppressed from being affected by the plurality of the recessed parts 32 provided in the end face of the magnet 20.

Further, in this embodiment, an end portion on the inner peripheral side of the end face of the magnet 20 is formed to be the tapered face 31 inclined toward the inner peripheral side and the plurality of the recessed parts 32 is provided in the tapered face 31. Therefore, in the magnet holding flange portions 42 and 43, a thickness of the portion 39a which covers the tapered face 31 is larger in the upper and lower direction than a thickness of a portion which covers the ring-shaped face 34 on an outer side with respect to the tapered face 31. In other words, in the magnet holding flange portions 42 and 43, a thickness in the axial line direction of the portion which is adhered to each of the surfaces of the plurality of the recessed parts 32 is secured. As a result, the magnet 20 can be surely held by the magnet holding flange portions 42 and 43 and thus turning prevention can be surely attained and, in addition, scattering of the magnet 20 is easily prevented.

In addition, in this embodiment, the ring-shaped groove 36 is provided in the end face of the magnet 20 and the magnet holding flange portions 42 and 43 are adhered to the entire surfaces of the ring-shaped grooves 36. Therefore, in the magnet holding flange portions 42 and 43, adhered areas of the magnet holding flange portions 42 and 43 to the magnet 20 are increased through the portions which are adhered to the faces of the ring-shaped grooves 36 and thus the magnet 20 can be prevented from scattering. Accordingly, scattering of the magnet 20 is easily prevented. In this embodiment, the ring-shaped groove 36 is provided with a circular arc-shaped cross section and thus a portion where the ring-shaped groove 36 is provided in the magnet 20 is prevented or suppressed from being broken.

Further, in this embodiment, the number of the connected parts 40 of the holding member 21 which are radially extended in the radial direction is the same number of the recessed parts 32 of the magnet 20, and the holding member 21 holds the magnet 20 so that the respective recessed parts 32 of the magnet 20 are located on outer sides in the radial direction of the respective connected parts 40. Therefore, when the holding member 21 is to be formed by insert molding in a state that the magnet 20 is inserted in an inside of a die, the resin injected into the die and circulated through die portions for forming a plurality of the connected parts is easily filled in the recessed parts 32 of the end face of the magnet 20 without gap spaces.

In addition, in this embodiment, the tapered face 31 and the ring-shaped face 33 are provided in an end portion on the inner peripheral side of the magnet 20 and thus, when the magnet 20 is to be compression molded, the recessed parts 32 can be easily formed in the tapered face 31.

Other Embodiments

In the embodiment described above, the recessed parts 32 and the ring-shaped groove 36 are provided in both of the upper and lower end faces of the magnet 20. However, the recessed parts 32 and the ring-shaped groove 36 may be provided only in one of the upper and lower end faces. Further, the ring-shaped groove 36 may be omitted.

In the embodiment described above, the tapered face 31 is provided in an end portion on an inner peripheral side of the magnet 20 and the recessed parts 32 are provided in the tapered face 31. However, it may be structured that the recessed parts 32 are provided in a flat end face of the magnet 20 without providing the tapered face 31 in the end face of the magnet 20.

In addition, instead of the ring-shaped groove 36, the end face of the magnet 20 may be provided with a plurality of circular arc-shaped grooves.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A rotor of a motor comprising:
a rotation shaft;
a magnet which is disposed on an outer peripheral side with respect to the rotation shaft;
a holding member which holds the rotation shaft and the magnet; and
a plurality of recessed parts which are provided in an end face of the magnet in an axial line direction of the rotation shaft so as to be separated from each other in a circumferential direction;
wherein a surface of each of the recessed parts is formed in a spherical shape;
wherein the holding member comprises a flange portion which covers the end face of the magnet from an end on an inner peripheral side of the end face of the magnet to an outer peripheral side with respect to the plurality of the recessed parts; and
wherein the flange portion is adhered to the surfaces of the recessed parts.

2. The rotor of a motor according to claim 1, wherein the plurality of the recessed parts is provided on the inner peripheral side of the end face of the magnet.

3. The rotor of a motor according to claim 2, wherein
the magnet is formed in a ring shape and surrounds the rotation shaft,
an end portion on the inner peripheral side of the end face of the magnet comprises a tapered face which is inclined toward the inner peripheral side, and
the plurality of the recessed parts is provided in the tapered face.

4. The rotor of a motor according to claim 3, wherein
the end face of the magnet comprises a groove extended around an axial line of the rotation shaft on an outer peripheral side with respect to the plurality of the recessed parts, and
the flange portion covers the end face of the magnet to an outer peripheral side with respect to the groove and adheres to a surface of the groove.

5. The rotor of a motor according to claim 4, wherein a cross section of the groove which is cut in a radial direction is a circular arc shape.

6. The rotor of a motor according to claim 3, wherein the plurality of the recessed part comprises the tapered face at equal intervals in the circumferential direction so as to have a size so that turning of the magnet with respect to the holding member formed of resin is prevented.

7. The rotor of a motor according to claim 6, wherein
the end face of the magnet comprises a groove extended around an axial line of the rotation shaft over an entire periphery of the end face on an outer peripheral side with respect to the plurality of the recessed parts, and
the flange portion covers the end face of the magnet to an outer peripheral side with respect to the groove and adheres to an entire surface of the groove.

8. The rotor of a motor according to claim 7, wherein a cross section of the groove which is cut in a radial direction is a circular arc shape.

9. The rotor of a motor according to claim 3, wherein
the holding member is a resin molded product comprising:
a rotation shaft holding part in a tube shape which holds the rotation shaft from an outer peripheral side;
a magnet holding part in a ring shape which holds the magnet on an outer peripheral side with respect to the rotation shaft holding part; and
a plurality of connecting parts which are extended in a radial direction and connect the rotation shaft holding part with the magnet holding part,
the magnet holding part comprises the flange portion,
a number of the plurality of the recessed parts and a number of the plurality of the connecting parts are the same as each other, and
each of the recessed parts is located on an outer side with respect to each of the connecting parts in the radial direction.

10. The rotor of a motor according to claim 9, wherein
the end face of the magnet comprises a groove extended around an axial line of the rotation shaft on an outer peripheral side with respect to the plurality of the recessed parts, and
the flange portion covers the end face of the magnet to an outer peripheral side with respect to the groove and adheres to a surface of the groove.

11. The rotor of a motor according to claim 10, wherein a cross section of the groove which is cut in a radial direction is a circular arc shape.

12. The rotor of a motor according to claim 9, wherein the plurality of the recessed parts is provided in the tapered face at equal intervals in the circumferential direction so as to have a size so that turning of the magnet with respect to the holding member is prevented.

13. The rotor of a motor according to claim 12, wherein
the end face of the magnet comprises a groove extended around an axial line of the rotation shaft over an entire periphery of the end face on an outer peripheral side with respect to the plurality of the recessed parts, and
the flange portion covers the end face of the magnet to an outer peripheral side with respect to the groove and adheres to an entire surface of the groove.

14. The rotor of a motor according to claim 3, wherein
the magnet is a compression-molded product, and
an end portion on an inner peripheral side of the end face of the magnet comprises a ring-shaped face on an inner peripheral side of the tapered face.

15. The rotor of a motor according to claim 14, wherein
the end face of the magnet comprises a groove extended around an axial line of the rotation shaft on an outer peripheral side with respect to the plurality of the recessed parts, and
the flange portion covers the end face of the magnet to an outer peripheral side with respect to the groove and adheres to a surface of the groove.

16. The rotor of a motor according to claim 15, wherein a cross section of the groove which is cut in a radial direction is a circular arc shape.

17. The rotor of a motor according to claim 14, wherein the plurality of the recessed parts is provided in the tapered face at equal intervals in the circumferential direction so as to have a size so that turning of the magnet with respect to the holding member formed of resin is prevented.

18. The rotor of a motor according to claim 17, wherein
the end face of the magnet comprises a groove extended around an axial line of the rotation shaft over an entire periphery of the end face on an outer peripheral side with respect to the plurality of the recessed parts, and
the flange portion covers the end face of the magnet to an outer peripheral side with respect to the groove and adheres to an entire surface of the groove.

19. A motor comprising:
the rotor defined in claim 1; and
a stator comprising a plurality of coils arranged in a ring shape on an outer peripheral side with respect to the rotor.

20. The motor according to claim 19, wherein
the magnet is formed in a ring shape so as to surround the rotation shaft,
an end portion on the inner peripheral side of the end face of the magnet comprises a tapered face which is inclined toward the inner peripheral side, and
the plurality of the recessed parts is provided in the tapered face.

21. The motor according to claim 20, wherein
the end face of the magnet comprises a groove extended around an axial line of the rotation shaft on an outer peripheral side with respect to the plurality of the recessed parts, and
the flange portion covers the end face of the magnet to an outer peripheral side with respect to the groove and adheres to a surface of the groove.

22. The motor according to claim 21, wherein a cross section of the groove which is cut in a radial direction is a circular arc shape.

23. The motor according to claim 20, wherein
the holding member is a resin molded product comprising:
a rotation shaft holding part in a tube shape which holds the rotation shaft from an outer peripheral side;
a magnet holding part in a ring shape which holds the magnet on an outer peripheral side with respect to the rotation shaft holding part; and
a plurality of connecting parts which are extended in a radial direction and connect the rotation shaft holding part with the magnet holding part,
the magnet holding part comprises the flange portion,
a number of the plurality of the recessed parts and a number of the plurality of the connecting parts are the same as each other, and
each of the recessed parts is located on an outer side with respect to each of the connecting parts in the radial direction.

24. The motor according to claim 20, wherein
the magnet is a compression-molded product, and
an end portion on an inner peripheral side of the end face of the magnet comprises a ring-shaped face on an inner peripheral side of the tapered face.

25. A pump device comprising:
the motor defined in claim 19; and
an impeller which is attached to the rotation shaft of the rotor.

26. The pump device according to claim 25, wherein
the magnet is formed in a ring shape so as to surround the rotation shaft,
an end portion on the inner peripheral side of the end face of the magnet comprises a tapered face which is inclined toward the inner peripheral side, and
the plurality of the recessed parts is provided in the tapered face.

27. The pump device according to claim 26, wherein
the plurality of the recessed parts is provided in the tapered face at equal intervals in the circumferential direction so as to have a size so that turning of the magnet with respect to the holding member formed of resin is prevented.

28. The pump device according to claim 27, wherein
the end face of the magnet comprises a groove extended around an axial line of the rotation shaft over an entire periphery of the end face on an outer peripheral side with respect to the plurality of the recessed parts, and
the flange portion covers the end face of the magnet to an outer peripheral side with respect to the groove and adheres to an entire surface of the groove.

29. The pump device according to claim 25, wherein
the holding member is a resin molded product comprising:
a rotation shaft holding part in a tube shape which holds the rotation shaft from an outer peripheral side;
a magnet holding part in a ring shape which holds the magnet on an outer peripheral side with respect to the rotation shaft holding part; and
a plurality of connecting parts which are extended in a radial direction and
connect the rotation shaft holding part with the magnet holding part,
the magnet holding part comprises the flange portion, a number of the plurality of the recessed parts and a number of the plurality of the connecting parts are the same as each other, and each of the recessed parts is located on an outer side with respect to each of the connecting parts in the radial direction.

30. The pump device according to claim 28, wherein the magnet is a compression-molded product, and an end portion on an inner peripheral side of the end face of the magnet comprises a ring-shaped face on an inner peripheral side of the tapered face.

\* \* \* \* \*